United States Patent
Beckham et al.

(10) Patent No.: US 9,631,146 B2
(45) Date of Patent: *Apr. 25, 2017

(54) HYDROXIDE CATALYSTS FOR LIGNIN DEPOLYMERIZATION

(71) Applicant: Alliance for Sustainable Energy, LLC, Golden, CO (US)

(72) Inventors: Gregg T. Beckham, Denver, CO (US); Mary J. Biddy, Westminster, CO (US); Stephen C. Chmely, Golden, CO (US); Matthew Sturgeon, Arvada, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 451 days.

This patent is subject to a terminal disclaimer.

(21) Appl. No.: 14/047,905

(22) Filed: Oct. 7, 2013

(65) Prior Publication Data

US 2014/0107381 A1    Apr. 17, 2014

Related U.S. Application Data

(60) Provisional application No. 61/710,240, filed on Oct. 5, 2012, provisional application No. 61/857,964, filed on Jul. 24, 2013.

(51) Int. Cl.
*C10G 1/04* (2006.01)
*B01J 27/236* (2006.01)
(Continued)

(52) U.S. Cl.
CPC ............. *C10G 1/04* (2013.01); *B01J 23/007* (2013.01); *B01J 23/755* (2013.01); *B01J 27/236* (2013.01); *B01J 35/002* (2013.01); *B01J 37/0201* (2013.01); *B01J 37/031* (2013.01); *C10G 1/086* (2013.01); *C10G 2300/1014* (2013.01); *Y02P 30/20* (2015.11)

(58) Field of Classification Search
None
See application file for complete search history.

(56) References Cited

U.S. PATENT DOCUMENTS

| 5,776,424 A | 7/1998 | Martin et al. |
| 2008/0050792 A1* | 2/2008 | Zmierczak ............. C10G 1/002 435/161 |

(Continued)

FOREIGN PATENT DOCUMENTS

WO    WO 2010089691 A1 *  8/2010 ........... C08K 5/0033

OTHER PUBLICATIONS

Bozell et al., "Solvent fractionation of renewable woody feedstocks: Organosolv generation of biorefinery process streams for the production of biobased chemicals", Biomass Bioenergy, 2011, vol. 35, No. 10, pp. 4197-4208.

(Continued)

*Primary Examiner* — In Suk Bullock
*Assistant Examiner* — Philip Louie
(74) *Attorney, Agent, or Firm* — John C. Stolpa; Michael A. McIntyre

(57) ABSTRACT

Solid base catalysts and their use for the base-catalyzed depolymerization (BCD) of lignin to compounds such as aromatics are presented herein. Exemplary catalysts include layered double hydroxides (LDHs) as recyclable, heterogeneous catalysts for BCD of lignin.

12 Claims, 9 Drawing Sheets

(51) Int. Cl.

| | |
|---|---|
| C10G 1/08 | (2006.01) |
| B01J 37/03 | (2006.01) |
| B01J 23/00 | (2006.01) |
| B01J 23/755 | (2006.01) |
| B01J 35/00 | (2006.01) |
| B01J 37/02 | (2006.01) |

(56) References Cited

U.S. PATENT DOCUMENTS

| | | | | |
|---|---|---|---|---|
| 2008/0300352 | A1* | 12/2008 | Schomaker | C01B 13/363 524/381 |
| 2010/0254892 | A1* | 10/2010 | Takahashi | B01J 23/007 423/651 |
| 2011/0065814 | A1* | 3/2011 | Matson | C01B 3/22 518/702 |
| 2011/0152514 | A1* | 6/2011 | Kettling | C13K 1/02 536/124 |
| 2011/0275869 | A1* | 11/2011 | Prochazka | C10G 1/02 585/242 |
| 2012/0037486 | A1* | 2/2012 | O'Connor | C10G 2/30 201/2.5 |
| 2012/0116063 | A1* | 5/2012 | Jansen | C08H 8/00 530/507 |
| 2012/0302796 | A1* | 11/2012 | Dhepe | C07C 37/004 568/309 |
| 2013/0232853 | A1* | 9/2013 | Peterson | C07G 1/00 44/307 |
| 2016/0017381 | A1 | 1/2016 | Beckham et al. | |
| 2016/0052949 | A1 | 2/2016 | Beckham et al. | |

OTHER PUBLICATIONS

Debecker et al., "Exploring, Tuning and Exploiting the Basicity of Hydrotalcites for Applications in Hetergeneous Catalysis", Chemistry a European Journal, 2009, vol. 15, pp. 3920-3935.

Macala et al., "Hydrogen Transfer from Supercritical Methanol over a Solide Base Catalyst: A model for Lignin Depolymerization", ChemSusChem, 2009, vol. 2, pp. 215-217.

Macala et al., "Transesterification Catalysts from Iron Doped Hydrotalcite-like Precursors: Solid Bases for Biodiesel Production", Catalysis Letters, 2008, vol. 122, pp. 205-209.

Matson et al., "One-Pot Catalytic Conversion of Cellulose and of Woody Biomass Solids to Liquid Fuels", Journal of The American Chemical Society, 2011, vol. 133, pp. 14090-14097.

Aramendia et al., "Catalytic Transfer Hydrogenation of Citral on Calcined Layered Double Hydroxides", Applied Catalysis A—General, Jan. 2001, vol. 206, No. 1, pp. 95-101.

Azadi et al., "Liquid Fuels, Hydrogen and Chemicals from Lignin: A Critical Review", Renewable and Sustainable Energy Reviews, 2013, vol. 21, pp. 506-523.

Bond et al., "Integrated Catalytic Conversion of γ-Valerolactone to Liquid Alkenes for Transportation Fuels", Science, Feb. 2010, vol. 327, No. 5969, pp. 1110-1114.

Bontchev et al., "Synthesis, Characterization, and Ion Exchange Properties of Hydrotalcite Mg6Al2(OH)16(A)x(A')2-x•4H20 (A, A'=Cl-, Br-, I-, and NO3-, 2≥x≥0) Derivatives", Chemistry of Materials, 2003, vol. 15, pp. 3669-3675.

Choudhary et al., "Solvent-free Selective Oxidation of Benzyl Alcohol and Benzaldehyde by Tert-butyl Hydroperoxide Using MnO-4 -exchanged Mg—Al-hydrotalcite Catalysts", Catalysis Letters, Mar. 2003, vol. 86, No. 4, pp. 229-233.

Cunha et al., "Sorption Enhanced Steam Reforming of Ethanol on Hydrotalcite-like Compounds Impregnated with Active Copper", Chemical Engineering Research and Design, Mar. 2013, vol. 91, No. 3, pp. 581-592.

Drago et al., "Catalyzed Decomposition of N2O on Metal Oxide Supports", Applied Catalysis B: Environmental, 1997, vol. 13, pp. 69-79.

Fuchs et al., "Microbial Degradation of Aromatic Compounds—From One Strategy to Four", Nature Reviews Microbiology, Nov. 2011, vol. 9, pp. 803-816.

Furimsky, "Catalytic Hydrodeoxygenation", Applied Catalysis A: General, Jun. 12, 2000, vol. 199, No. 2, pp. 147-190.

Galkin et al., "Mild Heterogeneous Palladium-Catalyzed Cleavage of β—O—4'-Ether Linkages of Lignin Model Compounds and Native Lignin in Air", ChemCatChem, Jan. 2014, vol. 6, No. 1, pp. 179-184.

Ionescu et al., "Epoxidation of Cyclohexene With H2O2 and Acetonitrile Catalyzed by Mg—Al Hydrotalcite and Cobalt Modified Hydrotalcites", Catalysis Letters, 2010, vol. 134, Nos. 3-4, pp. 309-317.

Iyi et al., "Deintercalation of Carbonate Ions from a Hydrotalcite-Like Compound: Enhanced Decarbonation Using Acid-Salt Mixed Solution", Chemistry of Materials, 2004, vol. 16, pp. 2926-2932.

Jyothi et al., "Catalytic Transfer Reduction (CTR) of Alkyl Alkyl, Alkyl Aryl, Cyclic and Unsaturated Ketones Over Calcined Mg—Al Hydrotalcites", Journal of Molecular Cataysis A: Chemical, 2001, vol. 168, pp. 187-191.

Jyothi et al., "Chemoselective Transfer Hydrogenation Reactions over Calcined-Layered Double Hydroxides", The Bulletin of the Chemical Society of Japan, 2000, vol. 73, No. 6, pp. 1425-1427.

Kawabata et al., "Improved Fe/Mg—Al Hydrotalcite Catalyst for Baeyer-Villiger Oxidation of Ketones with Molecular Oxygen and Benzaldehyde", Hournal of Molecular Catalysis A: Chemical, Jul. 2006, vol. 253, Nos. 1-2 pp. 279-289.

Kim et al., "Computational Study of Bond Dissociation Enthalpies for a Large Range of Native and Modified Lignins", The Journal of Physical Chemistry Letters, 2011, vol. 2, No. 22, pp. 2846-2852.

Kooli et al., "FT-IR Spectroscopy Study of Surface Acidity and 2-Propanol Decomposition on Mixed Oxides Obtained upon Calcination of Layered Double Hydroxides", Langmuir, Apr. 1997, vol. 13, No. 8, pp. 2303-2306.

Kurokawa et al., "Solid Base-Catalyzed Reaction of Nitriles with Methanol to Form α, β-unsaturated Nitriles I. Conversion and Selectivity"Journal of Catalysis, Nov. 1990, vol. 126, No. 1, pp. 199-207.

Li et al., "Novel Ru—Mg—Al—O Catalyst Derived from Hydrotalcite-like Compound for NO Storage/Decomposition/Reduction", The Journal of Physical Chemistry C, 2007, vol. 111, pp. 10552-10559.

Li et al., "Regenerability of Hydrotalcite-Derived Nickel-Iron Alloy Nanoparticles for Syngas Production from Biomass Tar", ChemSusChem, Feb. 2014, vol. 7, No. 2, pp. 510-522.

Manayil et al., "CoAl—CrO4 Layered Double Hydroxides as Selective Oxidation Catalysts at Room Temperature", Industrial & Engineering Chemistry Research, 2011, vol. 50, pp. 13380-13386.

Miyata et al., "Anion-Exchange Properties of Hydrotalcite-Like Compounds", Clays and Clay Minerals, 1983, vol. 31, No. 4, pp. 305-311.

Mohapatra et al., "Reductive Cleavage of Azo Dyes and Reduction of Nitroarenes Over Trivalent Iron Incorporated Hexagonal Mesoporous Aluminophosphate Molecular Sieves", Applied Catalysis B: Environmental, 2003, vol. 46, No. 1, pp. 155-163.

Nalawade et al., "Layered Double Hydroxides: A Review", Journal of Scientific & Industrial Research, Apr. 2009, vol. 68, pp. 267-272.

Nguyen et al., "A Photochemical Strategy for Lignin Degradation at Room Temperature", Journal of The American Chemical Society, 2014, vol. 136, No. 4, pp. 1218-1221.

Onaka et al., "Recent Studies on Solid Acid Catalysis and Solid Base Catalysis for Fine Chemicals Synthesis", Journal of Synthetic Organic Chemistry, Japan, 2005, vol. 63, No. 5, pp. 492-502.

Pandey et al., "Lignin Depolymerization and Conversion: A Review of Thermochemical Methods", Chemical Engineering & Technology, Jan. 2011, vol. 34, No. 1, pp. 29-41.

Parida et al., "Mg/Al Hydrotalcites: Preparation, Characterisation and Ketonisation of Acetic Acid", Journal of Molecular Catalysis A: Chemical, 2000, vol. 151, pp. 185-192.

Parthasarathi et al., "Theoretical Study of the Remarkably Diverse Linkages in Lignin", The Journal of Physical Chemistry Letters, 2011, vol. 2, No. 20, pp. 2660-2666.

(56) References Cited

OTHER PUBLICATIONS

Paul et al., "Mesoporous Nickel-Aluminum Mixed Oxide: A Promising Catalyst in Hydride-Transfer Reactions", European Journal of Inorganic Chemistry, Nov. 2010, vol. 32, pp. 5129-5134.

Pinnavaia et al., "Organic chemical conversions catalyzed by intercalated layered double hydroxides (LDHs)", Applied Clay Science, Aug. 1995, vol. 10, Nos. 1-2, pp. 117-129.

Rahimi et al., "Chemoselective Metal-Free Aerobic Alcohol Oxidation in Lignin", Journal of The American Chemical Society, 2013, vol. 135, No. 17, pp. 6415-6418.

Richardson, "Layered Double Hydoxides as Anion- and Cation-Exchanging Materials", Dissertation Prepared for the Degree of Doctor of Philosophy, University of North Texas, May 2007, pp. 1-197.

Rives et al., "Layered Double Hydroxides (LDH) Intercalated with Metal Coordination Compounds and Oxometalates", Coordination Chemistry Reviews, Jan. 1999, vol. 181, No. 1, pp. 61-120.

Roberts et al., "Towards Quantitative Catalytic Lignin Depolymerization", Chemistry—A European Journal, May 16, 2011, vol. 17, No. 21, pp. 5939-5948.

Schirmer et al., "Microbial Biosynthesis of Alkanes", Science, Jul. 2010, vol. 329, No. 5991, pp. 559-562.

Segal et al., "Catalytic Decomposition of Alcohols, Including Ethanol, for In Situ H2 Generation in a Fuel Stream Using a Layered Double Hydroxide-derived Catalyst", Applied Catalysis A: General, Aug. 2003, vol. 248, Nos. 1-2, pp. 33-45.

Segal et al., "Low Temperature Steam Reforming of Methanol Over Layered Double Hydroxide-derived Catalysts", Applied Catalysis A: General, May 2002, vol. 231, Nos. 1-2, pp. 215-226.

Sharma et al., "Hyrdotalcite Catalysis of Hyrdrotreating Reactions", ACS Spring Meeting Preprints, obtained from http://web.anl.gov/PCS/acsfuel/preprint%20archivelFiles/36_2_ATLANTA_04-91_0570.pdf, 1991, pp. 570-577.

Silva et al., "Layered Double Hydroxides as Highly Efficient Photocatalysts for Visible Light Oxygen Generation from Water", Journal of The American Chemical Society, 2009, vol. 131, No. 38, pp. 13833-13839.

Song et al., "Hydrogenolysis of Lignosulfonate into Phenols Over Heterogeneous Nickel Catalysts", Chemical Communications, 2012, vol. 48, pp. 7019-7021.

Song et al., "Lignin Depolymerization (LDP) in Alcohol Over Nickel-based Catalysts via a Fragmentation-hydrogenolysis Process", Energy & Environmental Science, 2013, vol. 6, pp. 994-1007.

Turco et al., "Production of hydrogen from oxidative steam reforming of methanol: II. Catalytic activity and reaction mechanism on Cu/ZnO/Al2O3 hydrotalcite-derived catalysts", Journal of Catalysis, Nov. 2004, vol. 228, No. 1, pp. 56-65.

Wang et al., "Recent Development in Chemical Depolymerization of Lignin: A Review", Journal of Applied Chemistry, 2013, vol. 2013, pp. 1-9.

Wang et al., "Solvent Effects on the Hydrogenolysis of Diphenyl Ether with Raney Nickel and their Implications for the Conversion of Lignin", ChemSusChem, Aug. 2012, vol. 5, No. 8, pp. 1455-1466.

Xi et al., "Influence of water on the activity and stability of activated Mg—Al Hydrotalcites for Transesterification of Tributyrin with Methanol", Journal of Catalysis, 2008, vol. 254, No. 2, pp. 190-197.

Zaheer et al., "Robust Heterogeneous Nickel Catalysts with Tailored Porosity for the Selective Hydrogenolysis of Aryl Ethers", ChemCatChem, Jan. 2014, vol. 6, No. 1, pp. 91-95.

Zakzeski et al., "The Catalytic Valorization of Lignin for the Production of Renewable Chemicals", Chemical Reviews, 2010, vol. 110, pp. 3552-3599.

Zümreoglu-Karan et al., "Layered Double Hydroxides—Multifunctional Nanomaterials", Chemical Papers, 2012, vol. 66, No. 1, pp. 1-10.

\* cited by examiner

A.

B.

A.

B.

A.

B.

A.

B.

A.

B.

HYDROXIDE CATALYSTS FOR LIGNIN DEPOLYMERIZATION

CROSS-REFERENCE TO RELATED APPLICATIONS

This application claims priority to U.S. Provisional Application No. 61/710,240, filed Oct. 5, 2012, and to U.S. Provisional Application No. 61/857,964, filed Jul. 24, 2013, the contents of which are incorporated by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

The production of biofuels and commodity chemicals from lignocellulosic biomass is a major component of the international renewable energy technology portfolio. To date, most research efforts have focused on the cellulose and hemicellulose components of biomass. However, lignin constitutes nearly 30% of woody biomass and represents a rich source of organic macromolecules that can serve as precursors for aromatic and alkane derivatives. Lignin is thus an underutilized value stream in current biomass conversion technologies due to a lack of economic and technically feasible routes for lignin depolymerization and upgrading to fuels.

Native and mildly treated lignins can be depolymerized to aromatics with NaOH. In addition, base-catalyzed depolymerization (BCD) has also been applied for lignin deconstruction (e.g., the Kraft process and soda pulping) in the pulp and paper industry with aqueous-phase basic media. To date, efforts in BCD have relied on the use of liquid-phase, homogeneous lignin deconstruction, which requires substantial treatment to neutralize the resulting streams, and thus adds significantly to the cost of lignin deconstruction. For biofuels production, this strategy is not economically feasible. Thus, alternative technologies are needed for effective depolymerization of lignin in biomass for subsequent fuel and chemical production.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

Exemplary embodiments provide methods for degrading lignin by contacting the lignin with a layered double hydroxide (LDH) catalyst in the presence of a liquid solvent.

In certain embodiments, the LDH catalyst comprises a solid base support combined with nickel. The solid base support may be hydrotalcite (HTC), and the amount of nickel combined with the hydrotalcite may be between 1 wt % Ni/HTC and 25 wt % Ni/HTC or between 5 wt % Ni/HTC and 15 wt % Ni/HTC.

In some embodiments, the solvent is water or organic solvent such as methyl isobutyl ketone or ethanol. In certain embodiments, the contacting is carried out at a temperature of at least 200° C. or at a temperature ranging from 200° C. to 400° C. In exemplary embodiments, the contacting is carried out for at least 15 minutes or for less than one hour.

In some embodiments, the lignin is from a lignocellulosic biomass, and, in some embodiments, the cellulose and hemicellulose components of the lignocellulosic biomass have been at least partially removed.

In additional embodiments, the methods further involve a step of isolating a product of lignin degradation, such as an alkane or aromatic compound. Certain embodiments of the methods may further comprise a step of filtering the solvent, catalyst and lignin mixture to remove solid catalyst.

Additional embodiments also provide methods for degrading lignin by contacting the lignin with a layered double hydroxide (LDH) catalyst in the presence of water or an organic solvent, wherein the LDH catalyst comprises hydrotalcite impregnated with nickel at a ratio of between 1 wt % Ni/HTC and 15 wt % Ni/HTC.

Further embodiments provide layered double hydroxide catalysts for lignin degradation comprising hydrotalcite impregnated with nickel at a ratio of between 1 wt % Ni/HTC and 15 wt % Ni/HTC.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

FIG. 2A shows the structure of the model lignin compound 2-phenoxy-1-phenethanol (PE), while FIG. 2B shows the base-catalyzed β-O-4 bond cleavage in the model compound PE to produce phenol and acetophenone.

DETAILED DESCRIPTION

Solid base catalysts and their use for the base-catalyzed depolymerization (BCD) of lignin to compounds such as aromatics are presented herein. Such solid base catalysts avoid the cost of liquid-phase, non-recyclable base, and downstream processing steps such as neutralization. Exemplary catalysts include layered double hydroxides (LDHs) as recyclable, heterogeneous catalysts for BCD of lignin. Layered double hydroxides presented herein can act as solid base catalysts, and are stable in water and organic solvents at relatively high working temperatures.

Lignin is a heterogeneous alkyl-aromatic polymer that can comprise up to 30-40% of the plant cell wall by mass, depending on the plant type. During cell wall biosynthesis, it is thought that lignin is polymerized via radical coupling reactions from three monomeric units: p-coumaryl alcohol (H), coniferyl alcohol (G), and sinapyl alcohol (S), which exhibit different degrees of ring methoxy-substituents. The presence of three monomers with variable molecular connectivity imparts an inherently heterogeneous structure to lignin, resulting in a variety of C—O and C—C inter-monomer bonds with varying reactivity and bond strengths. Due to its heterogeneous structure and reactivity, production of fuels and chemicals from lignin has been technically challenging relative to carbohydrate utilization to date. As such, most conversion processes to produce fuels and chemicals from lignocellulosic biomass typically slate the residual lignin component for combustion to produce process heat and power. A primary technical hurdle in lignin utilization stems from the need to develop robust catalysts for lignin depolymerization to low molecular weight species that can be fractionated and catalytically upgraded.

Figure 1:
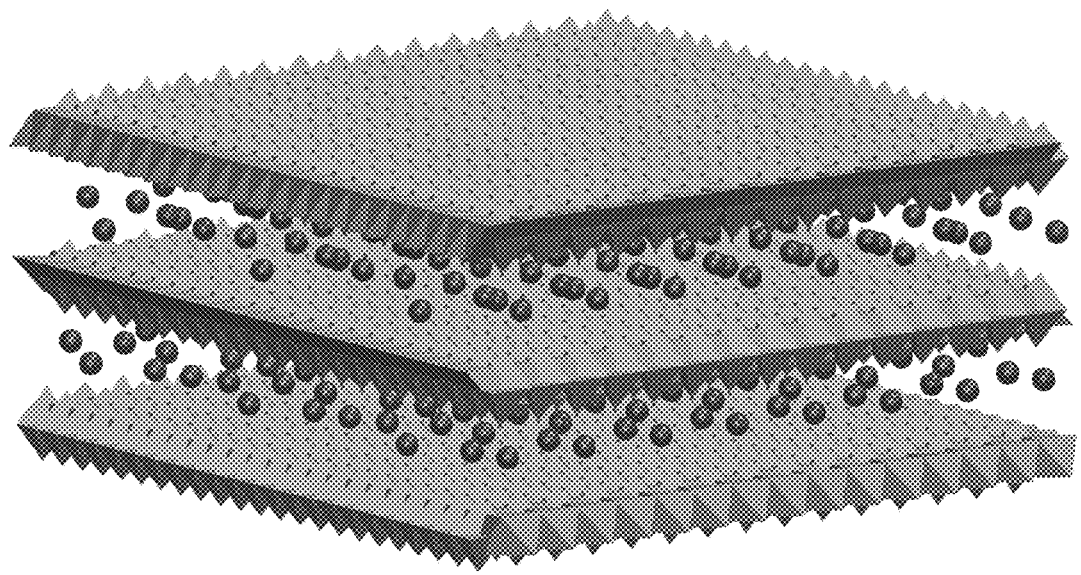
FIG. 1 shows a diagram of layered double hydroxides (LDHs) as ionic, lamellar materials with positively charged, brucite-like layers and interstitial anions.

Catalyst supports that exhibit alkaline character may be employed here as a starting point for catalyst design. Specifically, layered double hydroxides (LDHs) are ionic, lamellar materials with positively charged, brucite-like layers and interstitial anions, as illustrated in FIG. 1. These materials offer significant breadth of available chemistries as both the metals in the brucite-like layers and the anions in the interstitial layers are readily tuneable. LDHs may be used either directly as catalysts or as active supports in multifunctional catalysts, and LDHs possess a range of possible substrates given the ability to tune the interlayer spacing with different anions. LDHs and their metal oxide derivatives are stable in water and many organic solvents, are thermally stable, and are readily regenerated. Hydrotalcite (HTC), $Mg_6Al_2(OH)_{16}(CO_3) \cdot 4H_2O$, represents a specific example of LDH that exhibits a well-defined structure (FIG. 1).

LDH catalysts typically comprise a divalent metal ion component for which a water-soluble salt exists. Examples include chlorides or nitrates of first row transition metals. Specific suitable examples include magnesium (Mg), nickel (Ni), iron (Fe), cobalt (Co), copper (Cu), zinc (Zn), calcium (Ca), tin (Sn) and lead (Pb).

LDH catalysts typically also comprise a trivalent metal ion component that is present in a particular ratio in relation to the divalent cation. Suitable examples include aluminum (Al), scandium (Sc), gallium (Ga), or indium (In). The ratio of the divalent component to the trivalent component can vary from 1:1 to 10:1, such as 2:1, 3:1, 4:1, 5:1, 6:1, 7:1, 8:1, 9:1 or any fractional value within these ranges.

A layered double hydroxide, such as hydrotalcite (HTC), may be used as a support material to harbor hydroxide anions in the brucite-like layers, which may participate as a catalytic species (see FIG. 1). An exemplary catalyst is a 5 wt % Ni/HTC catalyst, which is particularly effective at C—O bond cleavage of a model dimer at 270° C. without nickel reduction. The 5% Ni-HTC catalyst is able to depolymerize biomass-derived lignin, such as Organosolv lignin. In addition, the oxidized nickel on a solid-basic support can function as an effective lignin depolymerization catalyst and demonstrates that layered double hydroxides offer a novel, active support in multifunctional catalyst applications.

The amount of a metal (such as nickel) combined with a solid base support (such as HTC) may be varied depending on the metal used and the desired catalyst properties. Exemplary metal percentages by weight range from about 1 wt % to 50 wt %, such as about 1, 2, 3, 4, 5, 6, 7, 8, 9, 10, 11, 12, 13, 14 15, 16, 17, 18, 19, 20, 25, 30, 35, 40, 45 or 50 wt %, as well as values between these integers. For example, a catalyst may comprise 1 wt % Ni/HTC, 5 wt % Ni/HTC, 10 wt % Ni/HTC, or 15 wt % Ni/HTC. In exemplary embodiments, nickel may be combined with the hydrotalcite in amounts between 1 wt % Ni/HTC and 25 wt % Ni/HTC or between 5 wt % Ni/HTC and 15 wt % Ni/HTC.

LDH synthesis may comprise mixing a water-soluble metal salt (e.g., halide or nitrate salt) for each of the divalent and trivalent metal ion component in water, adjusting the pH to about 10 or higher, and aging for 10 minutes to 15 hours. Isolation by filtration or centrifugation, washing of the isolated material, and drying yields the mixed-metal hydroxy carbonate hydrate material. Optional further treatment of this material by calcinations (e.g., at 350-400° C. for one to four hours) yields a poly-metal oxide (PMO) species. Additional details on catalyst synthesis and characterization are provided in the Examples below.

The catalysts may be used to deconstruct lignin model compounds, lignin from raw biomass, or lignin-enriched fractions of biomass. One example is biomass subjected to an organosolv biomass fractionation process (also known as clean fractionation). Biomass subjected to this process is divided into cellulose, hemicelluloses and lignin fractions, each of which may be further processed for fuel or chemical production. In one embodiment, the catalysts described herein are part of an integrated process wherein biomass is first fractionated into streams, and the resulting lignin stream is catalytically degraded to yield fuels, chemicals, or precursors for the same.

The data presented in the Examples below demonstrate that the LDH catalysts are very active in the cleavage of a β-O-4 linkage in a lignin model compound as well as for the depolymerization of biomass-derived lignin. The catalysts may be used to deconstruct biomass-derived lignin, yielding significant amounts of low-molecular weight species when compared to non-catalysed thermal treatment. Without wishing to be bound by any particular theory, it is hypothesized that the catalytic activity results from a synergistic effect between the metal species (e.g., nickel) with the HTC support, and that (in the case of a metal such as nickel) $Ni(NO_3)_2$ readily converts to $Ni(OH)_2$ upon interaction with HTC, which further converts to a mixed valence nickel oxide, generating a novel material that is an effective catalyst for lignin depolymerization. The durability of this catalyst system overall in terms of metal retention, ease of preparation, and temperature stability renders it suitable for a broad range of solvent systems, operating conditions, and catalytic chemistries for applications in biomass conversion.

Methods for degrading lignin are also described herein. As used herein, degrading, deconstructing or depolymerizing are synonymous terms for breaking complex lignin polymers down into more basic polymeric or monomeric compounds such as alkanes or aromatic compounds. In some embodiments, these compounds may be isolated and further purified or processed.

Lignin may be degraded by contacting a lignin-containing material with an LDH catalyst as described herein at a temperature and for a time sufficient to degrade the lignin. In certain embodiments, the lignin and catalyst are contacted in an aqueous solvent such as water or in an organic solvent. Exemplary organic solvents include alcohols such as methanol, ethanol, propanol, and isopropanol and ketones such as acetone and methyl isobutyl ketone (MIBK). In certain embodiments, the aqueous solvent may be water. The step of contacting the lignin with the catalyst may be performed in any reaction vessel or chamber suitable for digestion of biomass or base catalyzed degradation of lignin.

In some embodiments, lignin may be contacted with an LDH catalyst for several minutes, hours or days. Exemplary times include at least 5, 10, 15, 20, 30, 45 or 60 minutes; or at least 1, 2, 3, 4, 8, 12, 16 or 24 hours. Lignin may also be contacted with an LDH catalyst for one to ten days or more. In exemplary embodiments, lignin and the catalyst may be contacted for at least 15 minutes or for less than one hour.

Degradation times and temperatures will vary based on the lignin source, LDH catalyst and solvent system used. Exemplary temperatures include 100, 150, 200, 250, 300, 350 or 400° C. For ethanol and MIBK solvents, suitable temperatures include at least about 150° C., 185° C., 270° C., or 285° C. Suitable temperatures may range from about 100° C. to about 500° C., from about 200° C. to about 400° C., or from about 250° C. to about 350° C. In certain embodiments, the lignin may be contacted with the catalyst at a temperature of at least 100° C., at least 200° C., at least 250° C., or at least 300° C.

Exemplary lignin-containing materials include lignocellulosic biomass such as bioenergy crops, agricultural residues, municipal solid waste, industrial solid waste, sludge from paper manufacture, yard waste, wood and forestry waste. Examples of biomass include, but are not limited to, corn grain, corn cobs, crop residues such as corn husks, corn stover, corn fiber, grasses, wheat, wheat straw, barley, barley straw, hay, rice straw, switchgrass, waste paper, sugar cane bagasse, sorghum, soy, components obtained from milling of grains, trees, branches, roots, leaves, wood (e.g., poplar) chips, sawdust, shrubs and bushes, vegetables, fruits, flowers and animal manure.

Lignin may be degraded by contacting a lignocellulosic biomass directly with the catalyst. Alternatively, the lignocellulosic biomass may first be processed, purified or pretreated prior to being contacted with the catalyst. For example, the cellulose and hemicellulose components of lignocellulose may be at least partially removed prior to the step of contacting. Exemplary methods for at least partially purifying lignin from cellulose and hemicellulose include the Organosolv process (also known as Clean Fractionation or CF) or by preparing ball-milled lignin from biomass such as corn stover, as described in the Examples below. Any source of lignin, however, is suitable for use with the catalysts and methods described herein.

The resulting products after lignin degradation may also be fractionated, isolated, purified, and/or converted to additional products. Examples include conversion to higher alcohols, hydrocarbons, or other advanced fuels via biological or chemical pathways, or combinations thereof. Deconstruction/degradation products of lignin can also be converted to fine or commodity chemicals via biological or chemical pathways, or combinations thereof.

Methods of fractionating, isolating or purifying components of the reaction (e.g., catalyst, solvent, products of lignin degradation and/or remaining lignin) are available to those of skill in the art. In certain embodiments, the reaction mixture may be filtered to separate remaining solid catalyst from the lignin degradation products present in the liquid portion. Products may be further extracted from the solvent and/or purified using conventional methods. Exemplary methods for purification or isolation of products include affinity chromatography, ion exchange chromatography, solvent extraction, filtration, centrifugation, electrophoresis, hydrophobic interaction chromatography, gel filtration chromatography, reverse phase chromatography, chromatofocusing, differential solubilization, preparative disc-gel electrophoresis, isoelectric focusing, HPLC, reversed-phase HPLC, or countercurrent distribution.

EXAMPLES

Example 1

Materials

All solvents: acetone (HPLC grade, Fisher), ethanol (200 proof Pharmco-AAPER), methanol (lab grade, Fisher), diethyl ether (99.5%, Fisher), and methyl isobutyl ketone (reagent grade, Fisher) were used as received. 2-bromoacetophenone, phenol, potassium carbonate, potassium iodide, sodium borohydride, magnesium sulphate, nickel nitrate, and hydrotalcite were all purchased from Sigma-Aldrich and used as received.

Example 2

Synthesis of Model Lignin Compound

For use as a model lignin compound in subsequent depolymerization assays, 2-phenoxy-1-phenethanol (see FIG. 2A) was prepared according to published procedures as set forth below, and its purity was verified by comparison to published $^1H$ and $^{13}C$ NMR spectroscopic data.

Step 1: 2-Phenoxy-1-phenylethanone was synthesized in the following manner: A round bottom flask equipped with a reflux condenser was charged with 2-bromoacetophenone (1.1942 g, 60 mmol), phenol (7.0582 g, 75 mmol), $K_2CO_3$ (12.3000 g, 89 mmol), KI (catalytic) and acetone (250 mL). The resulting mixture was heated to reflux and allowed to react for 3 h, after which it was filtered and concentrated. 2-Phenoxy-1-phenylethanone was crystallised from cold ethanol (250 mL) (85% yield). Step 2: 2-Phenoxy-1-phenylethanone (1.1089 g, 5.2 mmol) was dissolved in 35 mL of methanol. Sodium borohydride (0.3534 g, 10.4 mmol) was added portion-wise generating a gentle evolution of gas, after which the reaction mixture was stirred at room temperature for 2 h. The reaction was quenched with a saturated aqueous $NH_4Cl$ solution (30 mL). The resultant mixture was extracted with 20 mL diethyl ether three times. The combined organic extracts were dried with 50 mL saturated brine solution, dried over $MgSO_4$, and filtered. The filtrate was evaporated to dryness to afford an off-white solid of 2-phenoxy-1-phenylethanol (80% yield). The solid was dried overnight in a vacuum desiccator.

Example 3

Synthesis and Characterization of Catalysts

The general procedure for the synthesis of the layered double hydroxide (LDH) materials is as follows, using MgAl-LDH as an example. Adjustments to the ratios of starting reagents can be made to alter the ratio of metal atoms in the products and are noted when applicable. An aqueous solution of metal-ion precursors with ratio Mg:Al of 3:1 was prepared by dissolving 30.87 g $Mg(NO_3)_2 \cdot 6H_2O$ (120 mmol) and 15.01 g $Al(NO_3)_3 \cdot 4H_2O$ (40 mmol) in 100 mL deionized water. A separate basic aqueous solution was prepared by dissolving 12.82 g NaOH (320 mmol) and 2.02 g $Na_2CO_3$ (20 mmol) in 100 mL deionized water. A 1 liter 3-neck flask was charged with 300 mL deionized water and a magnetic stir bar. Two dropping funnels were attached to the flask and charged with each solution. The solutions were rapidly added simultaneously to the 3-neck flask while stirring vigorously to form a solid white precipitate. After each solution had been added, the resulting suspension was heated to 80° C. and stirred vigorously for 18 hours. The solid material was centrifuged and rinsed with hot deionized water three times and dried in a vacuum oven to produce a white solid material.

The procedure for producing Ni-containing LDH material (NiAl-LDH) was the same as that for the MgAl-LDH material with the following exception: 34.89 g $Ni(NO_3)_2 \cdot 6H_2O$ (120 mmol) was used in place of $Mg(NO_3)_2 \cdot 6H_2O$.

Nickel-supported HTC was synthesized using wet impregnation, wherein $Ni(NO_3)_2 \cdot 6H_2O$ dissolved in ethanol was directly loaded onto commercial HTC. Three catalysts were initially synthesized at nickel loadings of 1.0, 5.0, and 11.0 wt % for screening purposes. Based on the desired weight loading, a solution of $Ni(NO_3)_2 \cdot 6H_2O$ in absolute ethanol was combined with the hydrotalcite support with constant stirring and this mixture was then left on a heating plate, at 25° C., to dry completely overnight. EA of 5 wt % Ni/HTC gave Al 10.46 wt. %, Mg 17.36 wt. %, and Ni 4.44 wt. %. Common post synthesis modifications of supported nickel catalysts often include calcination and reduction. Thus, two additional modified catalysts were synthesized and screened: 5 wt % Ni/HTC was calcined at 300° C. in air and a sample of 5 wt % Ni/HTC was reduced under 5% $H_2$ (He balance) at 250° C. for 2.5 h. Unless specified, catalysts were used as synthesized without modification.

The general procedure for the synthesis of the Mg/Al poly-metal oxide material (MgAl-PMO) is as follows. Isolated LDH material from the above preparations was calcined in a box furnace at 360° C. for 15 hours to remove any intercalating anions. After calcination, the material was rapidly transferred to a vacuum desiccator to cool under vacuum.

For characterization of catalyst materials, powder X-ray diffraction (PXRD) measurement was carried out using Cu Kα radiation in steps of 0.2° over the 2θ range of 10-80°. The resulting patterns were compared to known patterns in the ICDD database for hydrotalcite and poly-metal oxides containing Mg and Al.

Example 4

Catalyst Activities

For tests of catalytic activity using model lignin compounds, a desired amount of catalyst, substrate, internal standard, and solvent were added to a 0.75 in swage union reactor. The reactor was sealed and placed in a fluidized sand bath and heated to the desired temperature (e.g., 110° C., 270° C. or 285° C.) for the desired time (e.g., one or two hours). At the end of the reaction, the reactor was carefully removed from the sand bath and placed in an ice-water bath for 5 minutes. Then, the reactor was opened and an aliquot of the liquid material was removed for analysis using GC/MS.

For tests of catalytic activity using biomass-derived lignin, reaction conditions were the same as those using model compounds, except a desired amount of isolated clean-fractionation lignin (prepared using an organosolv biomass fractionation process, see Bozell et al., *Biomass and Bioenergy* 35:4197-4208 (2011)) was used. After the reaction, all materials were removed and each reactor was rinsed with a small amount (about 8 mL) of acetone to transfer any remaining solid residue. This material was acetylated using acetic anhydride and pyridine and analyzed using gel-permeation chromatography.

Figure 3:
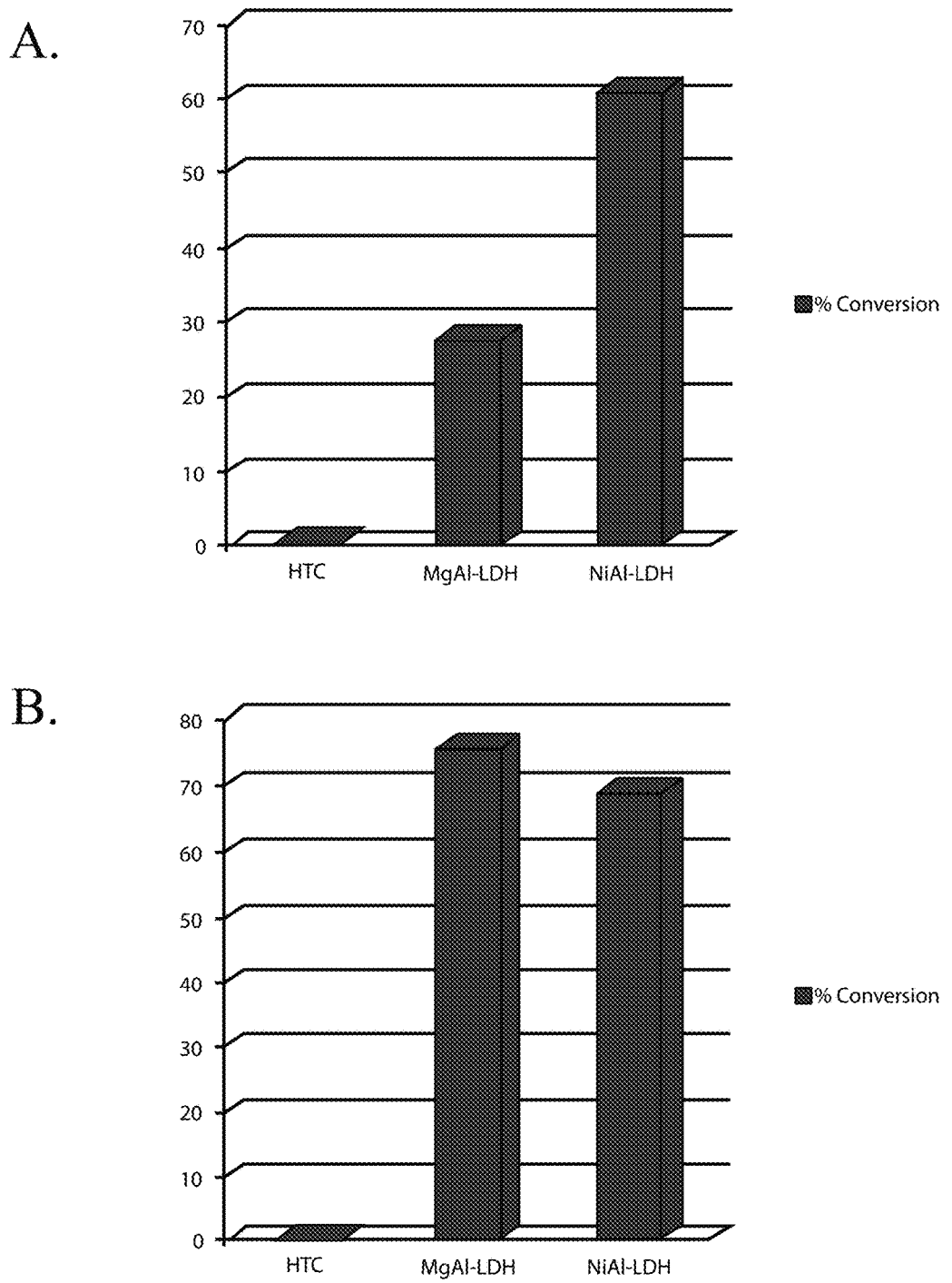
FIG. 3 shows a graph of the percentage conversion of lignin model compound PE in the presence of catalysts in a methyl isobutyl ketone (MIBK) solvent system (A) or in an ethanol solvent system (B). A comparison of commercial-grade hydrotalcite catalyst (HTC) with MgAl and NiAl layered double hydroxide catalysts is shown in each instance.

The results of the catalytic testing of the LDH materials in methyl isobutyl ketone (MIBK) are outlined in Table 1 and FIG. 3A. At 110° C. for 2 hours, no conversion of the model lignin compound was detected by GC/MS with any catalyst species. Commercial basic alumina and a 3:1 mixture of magnesium and aluminum hydroxide (Sigma Aldrich) were also tested as control experiments. Neither of these compounds showed any conversion under the same conditions.

At 285° C. ($T_{critical}$=300° C. for MIBK), the model lignin compound was converted to a variety of products in only 1 hour. Percentage conversion was measured using durene as an internal standard. By comparison, the commercial-grade hydrotalcite (HTC, Sigma Aldrich) showed less than 1% conversion, whereas MgAl-LDH and NiAl-LDH displayed much greater conversion (28 and 61%, respectively).

TABLE 1

| Catalyst | Temp, ° C. | Time, min | % Conversion |
| --- | --- | --- | --- |
| MgAl-LDH | 110 | 120 | 0 |
| Comm. HTC | 110 | 120 | 0 |
| MgAl-PMO | 110 | 120 | 0 |
| basic alumina | 110 | 120 | 0 |
| mixed hydroxides | 110 | 120 | 0 |
| MgAl-LDH | 285 | 60 | 28 |
| comm. HTC | 285 | 60 | <1 |
| NiAl-LDH | 285 | 60 | 61 |

To test other relevant solvent systems, the same experiment was carried out using ethanol as a solvent rather than MIBK. The results of these experiments are outlined in Table 2 and FIG. 3B. At 285° C., which is above the critical temperature of ethanol, less than 5% conversion of the model lignin compound was detected in the absence of catalyst. In addition, conversion in the presence of commercial-grade hydrotalcite was less than 1%. However, conversion in the presence of MgAl-LDH and NiAl-LDH was substantial (76 and 69%, respectively).

TABLE 2

| Catalyst | Temp, °C. | Time, min | % Conversion |
|---|---|---|---|
| none | 285 | 60 | <5 |
| MgAl-LDH | 285 | 60 | 76 |
| comm. HTC | 285 | 60 | <1 |
| NiAl-LDH | 285 | 60 | 69 |

Example 5

Catalyst Screening Methods

Catalysts were screened via a heated batch reaction method. Catalysts were loaded into 3 mL stainless steel batch reactors and charged with 3 mL of stock solution giving PE or HH substrate to catalyst loading of 1:2. Experiments were run in triplicate. The reactors were tightly sealed and submerged in a heated temperature-controlled sand bath. Temperature was monitored with a thermal couple. After a designated time, the reactors were removed from the sand bath and the reaction was quenched immediately by inserting the reactors into an ice bath.

In the post reaction work up of products, the reactors were opened and the contents were centrifuged to collect the used catalyst. This catalyst was then washed with acetone, centrifuged, and left to dry for further analysis. The resulting solution was then brought up to a final volume of 10 mL with acetone. For the subsequent GC analysis, the products were diluted 10 times to bring final concentrations into calibrated range of 0-1 mM with a 1.0 mM durene internal standard. Samples were analyzed in an Agilent Technologies 7890A GC equipped with an FID detector employing an HP-5MS column (30 m×0.25 mm×film thickness 0.25 μm, Agilent Technologies). The temperature program was as follows: 45° C. hold for 3 minutes; ramp to 200° C. at 15° C./min hold for 6 minutes; total run time of 19.33 minutes. In all cases mass closures (based on conversion and production of phenol) were greater than 90%.

Example 6

Catalyst Activities

Figure 2:
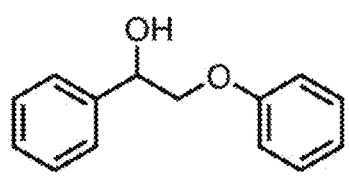
Figure 2:
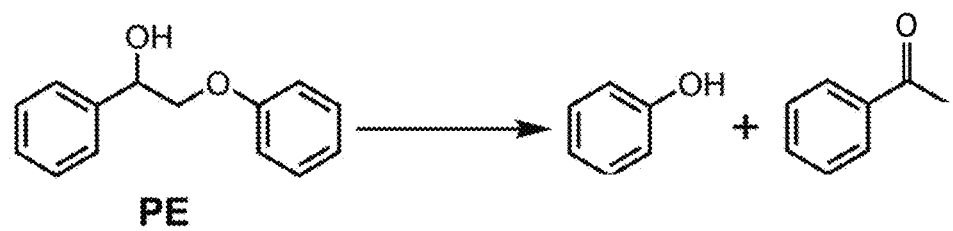

Catalytic activity was first screened on a lignin model compound 2-phenoxy-1-phenethanol (PE), shown in FIG. 2A. PE is a representative lignin model compound containing a β-O-4 alkyl-aryl-ether bond, which is the most abundant inter-monomer bond in native lignin. A temperature of 270° C. was used for the initial catalyst screening Methyl isobutyl ketone (MIBK) was used as the reaction solvent as it is a typical co-solvent used to fractionate biomass into its primary components in Organosolv processes. For each reaction, the catalyst of interest and a stock solution of PE dissolved in MIBK were loaded into a 3 mL stainless steel batch reactor at a loading of 2:1 wt:wt. Unless otherwise noted, catalysts were used as prepared without post synthesis modifications. The reactions were run at 270° C. for 1 hour in triplicate. The reaction mixture was washed from the reactor with a known amount of acetone and the catalyst was removed. In all cases, PE was converted to phenol and acetophenone (1-phenylethanone) by base-catalyzed cleavage of the β-O-4 aryl-ether bond (FIG. 2A). The resulting solution was analyzed by gas chromatography for concentration of PE, phenol, and acetophenone.

Figure 4:
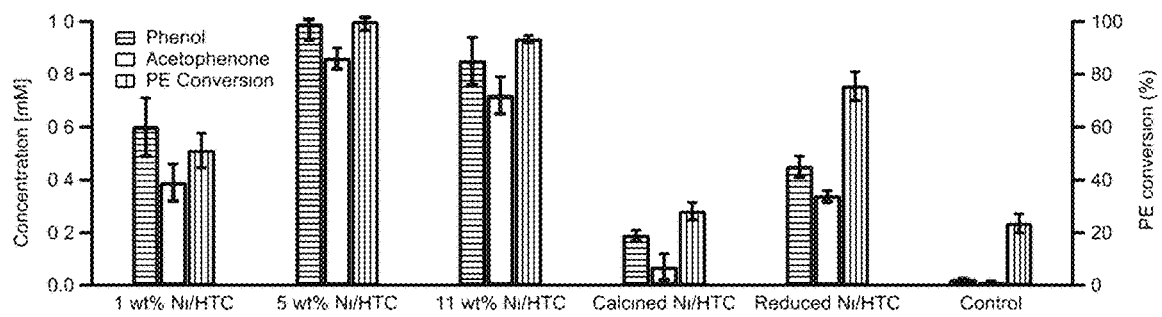
FIG. 4 shows results of catalyst screening with PE at 270° C. for 1 hour in MIBK (A) and results of secondary screening to ascertain the catalytic properties responsible for aryl-ether bond cleavage. The $Ni(NO_3)_2$, HTC, and $Ni/Al_2O_3$ reactions were conducted at 270° C. for 1 h in MIBK. The NaOH experiments were conducted in deionized $H_2O$. The original 5 wt % Ni/HTC results are shown for reference.
Figure 4:
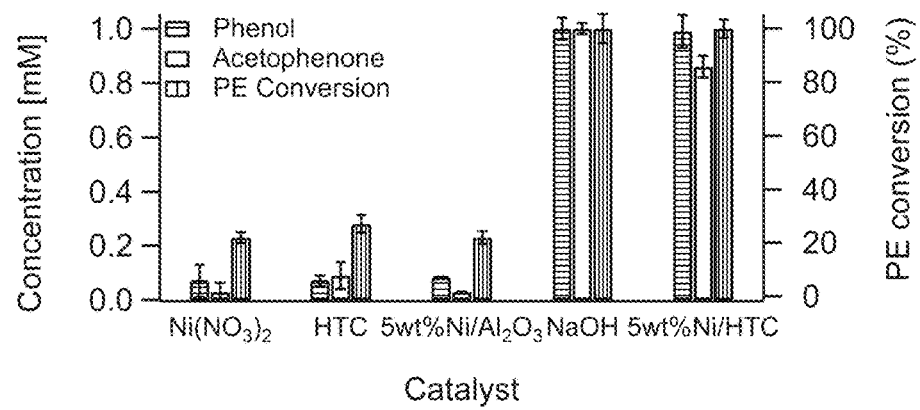

FIG. 4A details the results of the initial catalyst screening with 5 catalysts for activity on PE and a control run with PE and no catalyst. Under these conditions, the as-prepared, loaded Ni/HTC catalysts are the most active in PE conversion. Lowering the nickel loading from 11 to 5 wt % has little effect, and 1 wt % Ni/HTC still exhibits a conversion of about 50%. Little conversion was observed in the control reaction. Modification of the 5 wt % Ni/HTC catalyst via calcination or reduction lowers the activity to 28% conversion and 75% conversion, respectively. It is known that heating HTC can thermally remove the interstitial hydroxide anions (FIG. 1). As the hydroxide anions are hypothesized to be an active catalytic species and calcining may remove these species, it is perhaps not surprising that the calcined catalyst exhibits lower activity.

Additionally, LDH catalysts promote aldol condensation. A common result of the experiments illustrated in FIG. 4A as well as subsequent figures reporting conversion data for PE on HTC catalysts is the lower yield of acetophenone relative to phenol. GC/MS results suggest that MIBK undergoes a small amount of cross-condensation with acetophenone, as well as self-condensation reactions in the presence of HTC catalysts (data not shown), hence the acetophenone yield is lower. Mass closures of 90% and EDS (Table 3) indicate that little to no material is lost due to charring during reaction.

The results summarized in FIG. 4A demonstrate that 1, 5 and 11 wt % nickel-supported HTC are effective catalysts for cleavage of the β-O-4 bond. To ascertain the catalytic properties responsible for aryl-ether bond cleavage, a series of additional experiments were performed in which HTC alone (the support material containing interstitial hydroxide anions), Ni(NO$_3$)$_2$ (the loaded nickel species), and a 5 wt % Ni/Al$_2$O$_3$ catalyst (a standard supported nickel catalyst) were investigated as catalysts with PE. NaOH was also employed to determine if base-catalyzed cleavage produces the same reaction products. The Ni(NO$_3$)$_2$, HTC, and Ni/Al$_2$O$_3$ reactions were conducted at 270° C. for 1 hour in MIBK. The NaOH experiments were conducted in deionized H$_2$O. The original 5 wt % Ni/HTC results are shown for reference.

Results of these experiments are summarized in FIG. 4B. HTC alone and Ni(NO$_3$)$_2$ are not active catalysts, exhibiting only 28% and 23% conversion of PE respectively. The 5 wt % Ni/Al$_2$O$_3$ exhibits low, partial conversion of 23%. NaOH catalysis of PE in water produces the same product distribution as the HTC catalyzed-reaction, and the yield of acetophenone and phenol are equal here, further suggesting that HTC promotes aldol condensation of acetophenone and MIBK. Taken together, these results suggest that Ni/HTC catalytic activity is not a result of the individual species, but rather a synergistic effect between supported nickel and HTC, and that the mechanism follows one similar to base-catalyzed cleavage of PE.

Figure 5:
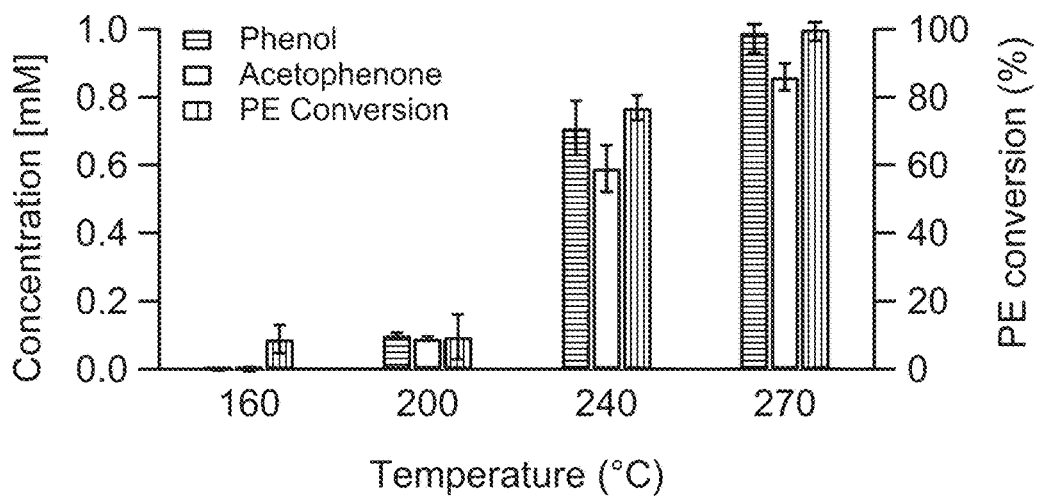
FIG. 5 shows the temperature effects on catalytic conversion of PE (A) and the results of recycling studies (B).
Figure 5:
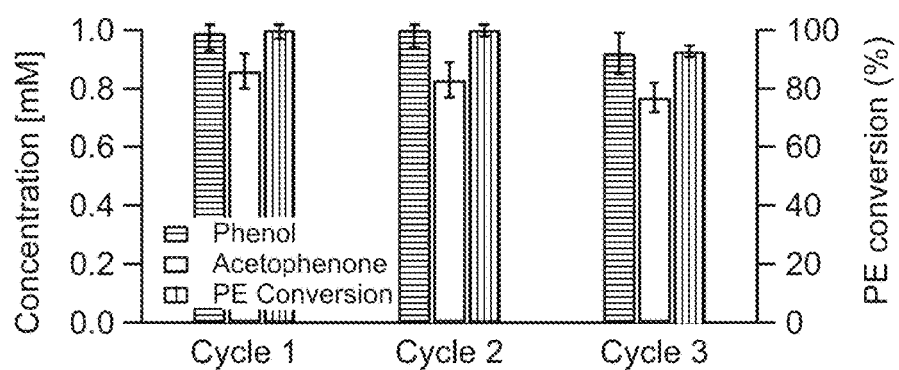

Additionally, the effect of reaction temperature on PE conversion was studied using the 5 wt % Ni/HTC catalyst with a one hour reaction time (FIG. 5A). PE conversion activity drops off at 150° C. with the majority of activity still remaining at 185° C. Activity was greatest at 270° C., showing over 90% PE conversion.

Preliminary recycling studies (5 wt % Ni/HTC catalyst; 270° C.; one hour) show that the 5 wt % Ni/HTC catalyst maintains activity over 3 catalytic cycles (FIG. 5B).

Example 7

Clean Fractionation Procedures

Fractionation of corn stover was carried out as follows: Whole corn stover (10 g) in a single-phase mixture of MIBK/acetone/H$_2$O (11/44/44 wt %, 100 mL) with sulfuric acid (0.1 M) was loaded into a Hastelloy pressure reactor.

The reactor was sealed and heated in an electric heating block at 140° C. for 56 minutes. After the reaction, the reactor was cooled in ice water. Reaction mixture was filtrated and the residual solid was washed with the same solvent (200 mL) and deionized $H_2O$ (650 mL) to remove the soluble fraction completely. The combined black filtrate (MIBK/acetone/H2O) was mixed in a separatory funnel, shaken, and allowed to stand for 1 hour to separate the aqueous and organic phases. The aqueous layer was extracted with MIBK (25 mL). MIBK layers were combined, washed with deionized $H_2O$, evaporated to remove volatiles, and dried in a vacuum oven at 35° C. for 4 days to obtain the lignin-enriched fraction.

Example 8

Gel Permeation Chromatography (GPC) Analysis

After the catalytic degradation of CF-lignin (20 mg), the reaction mixture and wash solvent (10 mL of acetone) was filtrated through a 0.2 µm nylon membrane syringe filter. The filtrate was concentrated to approximately 2 mL using a gentle stream of nitrogen gas. The degradation mixture was acetylated in a mixture of pyridine (0.5 mL) and acetic anhydride (0.5 mL) at 35° C. for 24 hours with stirring. The reaction of acetylation was terminated by addition of methanol (0.2 mL) to neutralize the acetic anhydride. The acetylation solvents were then evaporated from the samples at 40° C. under a stream of $N_2$. The samples were further dried in a vacuum oven at 40° C. overnight. The dried acetylated degradation products were dissolved in tetrahydrofuran (THF, Baker HPLC grade) to a final concentration of 2 mg/mL. The dissolved samples were filtered (0.45 µm nylon membrane syringe filters) before GPC analysis. The acetylated samples appeared to be completely soluble in THF. GPC analysis was performed using an Agilent HPLC with 3 GPC columns (Polymer Laboratories, 300×7.5 mm) packed with polystyrene-divinyl benzene copolymer gel (10 µm beads) having nominal pore diameters of $10^4$, $10^3$, and $10^2$ Å. The eluent was THF and the flow rate was 1.0 mL/min. An injection volume of 25 µL was used. The HPLC was attached to a diode array detector measuring absorbance at 260 nm (band width 40 nm). Retention time was converted into molecular weight by applying a calibration curve established using polystyrene standards.

Example 9

Degradation of Biomass-Derived Lignin

To determine if the 5 wt % Ni/HTC catalyst can degrade biomass-derived lignin, it was tested with lignin from an Organosolv process, Clean Fractionation (CF), at 270° C. for 1 hour in MIBK, and also tested with corn stover derived, ball-milled lignin (CS-BML) at 270° C. for 1 hour in water. Apparent molecular weights (MW) obtained by gel permeation chromatography (GPC) are provided in FIG. 6A (CF lignin) and 6B (CS-BML). A control reaction was also carried out in which the CF lignin was heated to 270° C. in MIBK (or CS-BML heated to 270° C. in water) to quantify uncatalysed degradation.

The original CF lignin shows a large MW range from 300-10,000 Da. Upon heating in MIBK ("Control" in FIG. 6A), the CF lignin exhibits lower MW due to thermal decomposition (200-2,000 Da). However the MW of the CF lignin run with the 5 wt % Ni/HTC catalyst in MIBK was substantially reduced, with a significant portion of material present as monomeric species (the GPC measurements for lignin are only semi-quantitative, and should primarily be interpreted as relative trends). The "CF Lignin" curve shows the molecular weight distribution of the original lignin from an Organosolv process. The "Control" and "5 wt % Ni/HTC" curves show the molecular weight distributions after reaction (270° C., 1 hour) of thermal and catalytic degradations, respectively, of the CF lignin.

Figure 6:
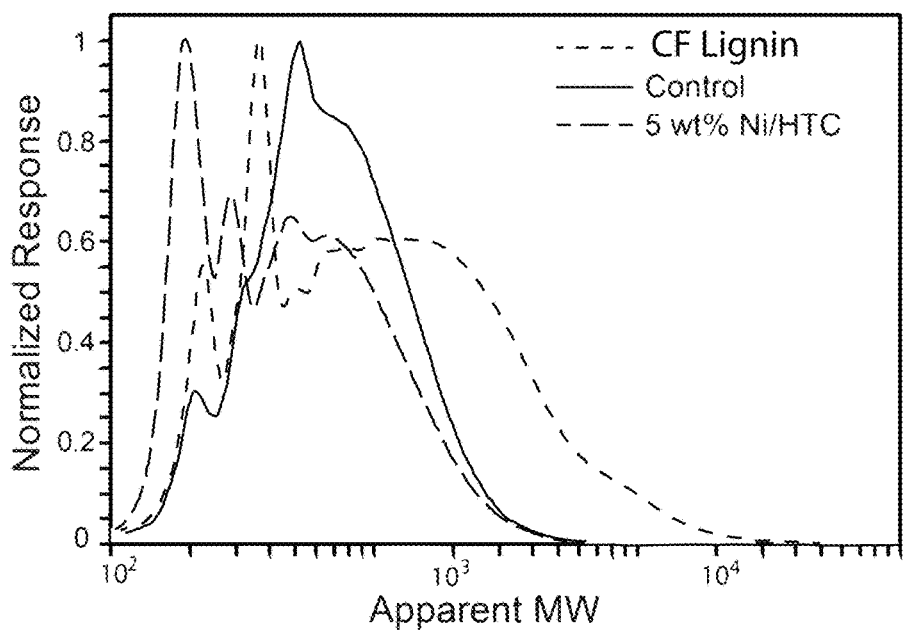
FIG. 6 shows gel permeation chromatography (GPC) data from the catalytic degradation of lignin from an Organosolv process (CF lignin) in MIBK (A) and of ball-milled lignin (CS-BML) in water (B).
Figure 6:
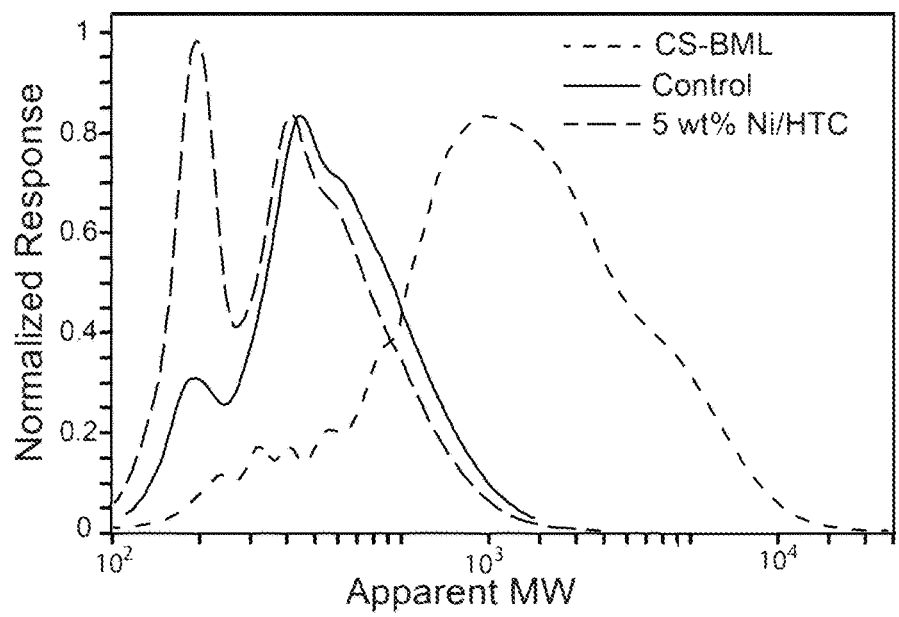

FIG. 6B shows that the CS-BML heated in water ("Control") also undergoes partial thermal depolymerization, and the catalyzed reaction ("5 wt % Ni/HTC") produces a significant amount of small molecular-weight species. The "CS-BML" curve shows the molecular weight distribution of the original lignin after ball milling. The "Control" and "5 wt % Ni/HTC" curves show the molecular weight distributions after reaction (270° C., 1 hour) of thermal and catalytic degradations, respectively, of the ball-milled lignin.

Example 10

X-Ray Diffraction

X-Ray Diffraction (XRD) was conducted on powdered samples using a Rigaku Ultima IV diffractometer with a Cu Kα radiation source (40 kV and 44 mA). Scans were collected from 10-80° 2θ with a step size of 0.01° using a dTex detector. Diffraction data were processed using Rigaku PDXL software, and peaks were matched against the International Centre for Diffraction Data (ICDD) database PDF 2009.

Interaction of the loaded nickel species with HTC and the fate of nickel in the 5 wt % Ni/HTC catalysts during reaction were studied before and after one PE conversion (2:1 catalyst loading, 270° C., 1 hour) using XRD. A change in the color of the catalyst was noted after reaction. The freshly prepared Ni/HTC catalyst is light green, and after reaction the catalyst is black. The XRD pattern of the catalyst (FIG. 7A) indicates that nickel in the bulk material is present as mainly $Ni(OH)_2$ rather than the loaded $Ni(NO_3)_2$ species. The prominent peak at 20° is from $Ni(OH)_2$, which arises from nickel interacting with the HTC. The XRD pattern of the used catalyst shows that under the reaction conditions (270° C.), features from a dehydrated HTC structure arise, as seen in the shift of the (003) peak at 11.4° 2θ to a higher angle and broadening of the (009) peak at 35° 2θ. The peaks arising from $Ni(OH)_2$ species (2θ=19.8°, 37.8°, and 43.5°) seen in the fresh catalyst shift for the used catalyst with the prominent peaks characterized as a mixed valence nickel oxide (2θ=21.1°, 36.9°, and 43.0°). This may indicate that the $Ni(OH)_2$ species (which is green) is converted to the mixed valence nickel oxide during reaction (which in its oxygen rich, non-stoichiometric structure is black). As shown in FIG. 5B, the recycling study indicates that the mixed valence nickel oxide species is still as active in PE conversion.

Example 11

X-Ray Photoelectron Spectroscopy

X-Ray Photoelectron Spectroscopy (XPS) analysis was performed using a Physical Electronics PE5600 XPS system. Samples were pressed into indium foil. Spectra were collected using a monochromatic Al Kα X-ray source operated at 350 W, hemispherical analyzer, and multichannel detector. A low-energy (~1 eV) electron flood gun was used for charge neutralization. Survey spectra were collected using an analyzer pass energy and step size of 187.85 eV and 0.8 eV/step, respectively. High-resolution spectra were collected using an analyzer pass energy of 23.50 eV and a step size of 0.1 eV/step. The quantification was performed using the default relative sensitivity factor (RSF) values supplied by the XPS manufacturer. Data analysis was performed using CasaXPS software. A linear background was applied to C1s, O1s and N1s spectra and Shirley background was used for Ni 2p and Mg 1s spectra. High-resolution spectra were charge referenced by setting the C1s hydrocarbon peak to 284.8 eV.

Figure 7:
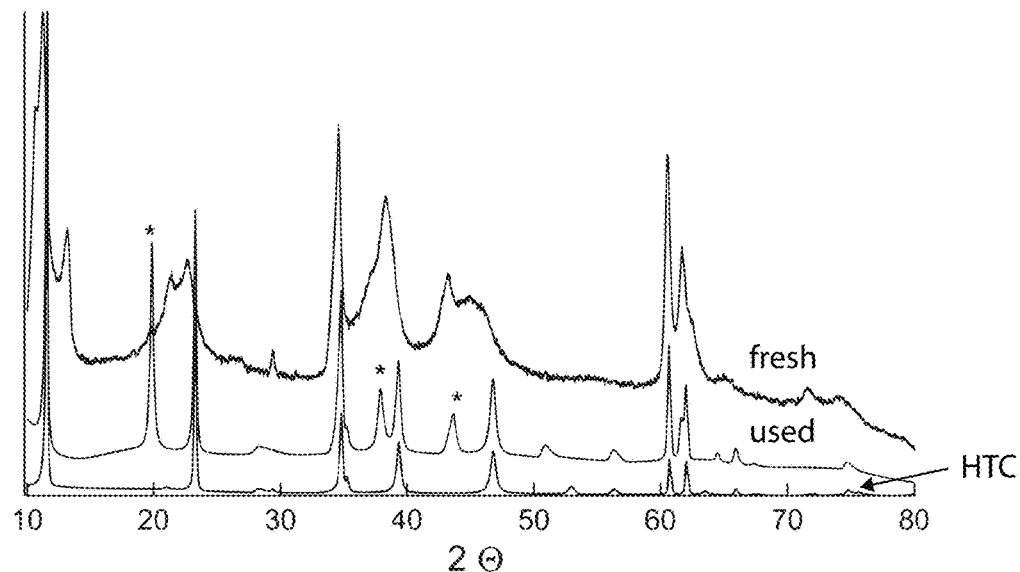
FIG. 7 shows the results of X-ray diffraction (A) and X-ray photoelectron spectroscopy (B) analyses of fresh and used 5 wt % Ni/HTC catalyst.
Figure 7:
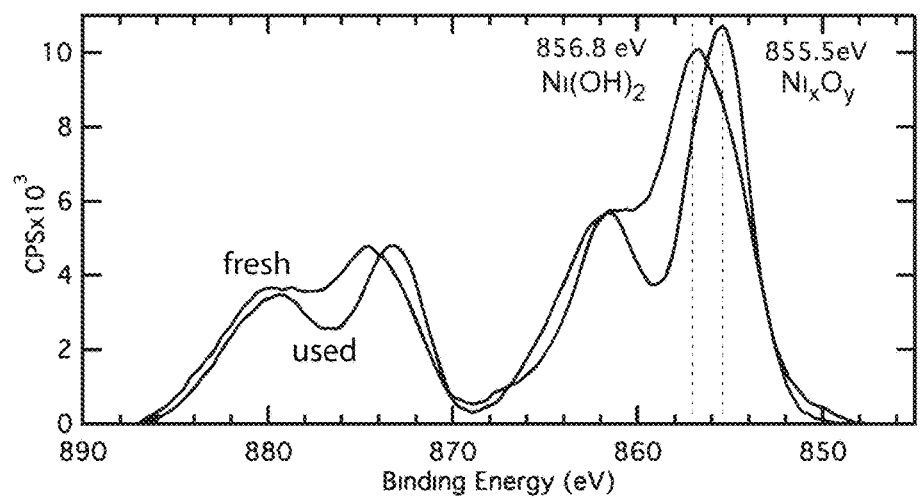

To gain further insight into the fate of nickel, XPS analysis was conducted on the same freshly prepared 5 wt % Ni/HTC catalyst as well as the 5 wt % Ni/HTC catalyst that had been used once for PE conversion (used catalyst; as with Example 10) (FIG. 7B). XPS analysis of the fresh catalyst indicates that nickel is present as $Ni(OH)_2$ and $Ni(NO3)_2$ as demonstrated by the asymmetry of the peak envelope centered at 856.8 eV. As XPS is quite sensitive to surface species, it is not surprising that $Ni(NO3)_2$, which is not observed in XRD analysis, is present in the spectra. This species combined with $Ni(OH)_2$ (confirmed in both XRD as well as XPS) is responsible for the light green color of the freshly synthesized catalyst. The presence of $Ni(OH)_2$ in the XPS spectrum confirms that there is indeed an interaction when nickel is loaded onto the HTC support that will immediately convert some of the $Ni(NO3)_2$ to $Ni(OH)_2$. $Ni(OH)_2$ is tightly bound to the support and is insoluble in both water as well as MIBK, as experimentally confirmed via hot water washes in which no nickel species were lost as indicated from SEM/EDS analysis (Table 3). After reaction, the peak formerly centered at 856.8 eV has sharpened and shifted to a slightly lower energy of 855.5 eV, indicating that both $Ni(NO3)_2$ (and likely $Ni(OH)_2$ as indicated by XRD) have converted to a mixed valence nickel oxide, which is responsible for the visually observed dark color in the used catalyst. There are no changes in binding energy of 852-853 eV that would indicate appearance of $Ni^0$, further indicating that changes in catalyst are due to conversion to nickel oxide species rather than reduction. This result is corroborated by the lower activity of the reduced catalyst shown in FIG. 4A relative to the high activity maintained over several runs by the mixed valence nickel oxide catalyst, as shown in FIG. 7B.

Example 12

Microscopy and Energy Dispersive X-Ray Spectroscopy

Scanning Electron Microscopy (SEM) was performed using a FEI Quanta 400 FEG instrument. Samples were mounted on aluminum stubs with conductive carbon tape adhesive and sputter-coated with 7 nm of iridium prior to imaging. Images were obtained at an accelerating voltage of 30 keV.

Energy Dispersive X-Ray Spectroscopy (EDS) was performed in the aforementioned SEM instrument equipped with an EDAX X-ray detector using the same sample preparation methods used for SEM imaging. Elemental composition was obtained from at least 5 EDS spectra collected at each experimental condition; spectra were quantified using an atomic number (ZAF) correction. EDS mapping was performed in Quant mode based on net intensity using dwell time of 200 ms per pixel.

For Transmission Electron Microscopy (TEM), catalyst particles were suspended in ethanol and drop-cast onto carbon coated, 200 mesh copper grids (SPI Supplies, West Chester, Pa.). Grids were allowed to air dry and images were captured with a four mega-pixel Gatan UltraScan 1000 camera (Gatan, Pleasanton, Calif.) on a FEI Tecnai G2 20 Twin 200 kV LaB6 TEM (FEI, Hilsboro, Oreg.).

Figure 8:
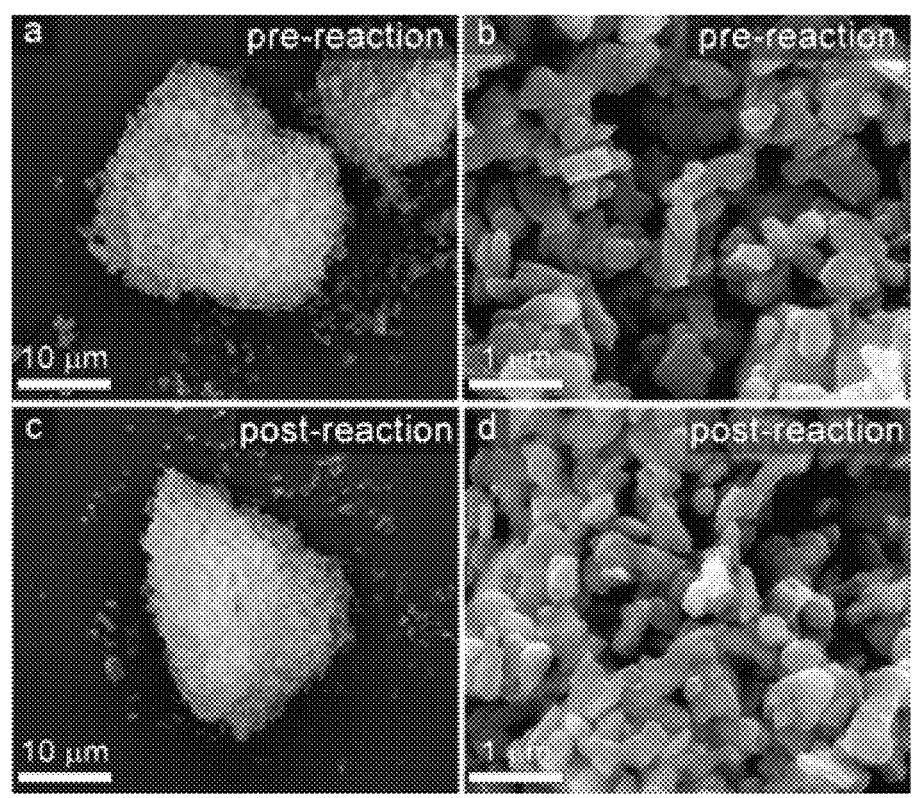
FIG. 8 shows scanning electron microscopy images of catalyst particles pre-reaction (Panels a and b) and post-reaction (Panels c and d).

SEM imaging provides insight as to why Ni/HTC is an active catalyst. HTC particles are on the order of ten of microns; however, the particles are agglomerates of nanoscale subunits, giving rise to a high surface area, macroporous network with pore diameters ranging from about 0.1 to 1 µm (FIG. 8). These pores are large relative to other catalysts, such as microporous zeolites, which are routinely used for conversion of petroleum-based and biomass-derived small molecular weight species. The larger pore sizes displayed by the HTC catalysts used in this study appear better suited to facilitate heterogeneous interaction with solubilized lignin polymers. Interestingly, no discernible changes to the catalyst microstructure were observed following chemical reaction (FIG. 8).

Figure 9:
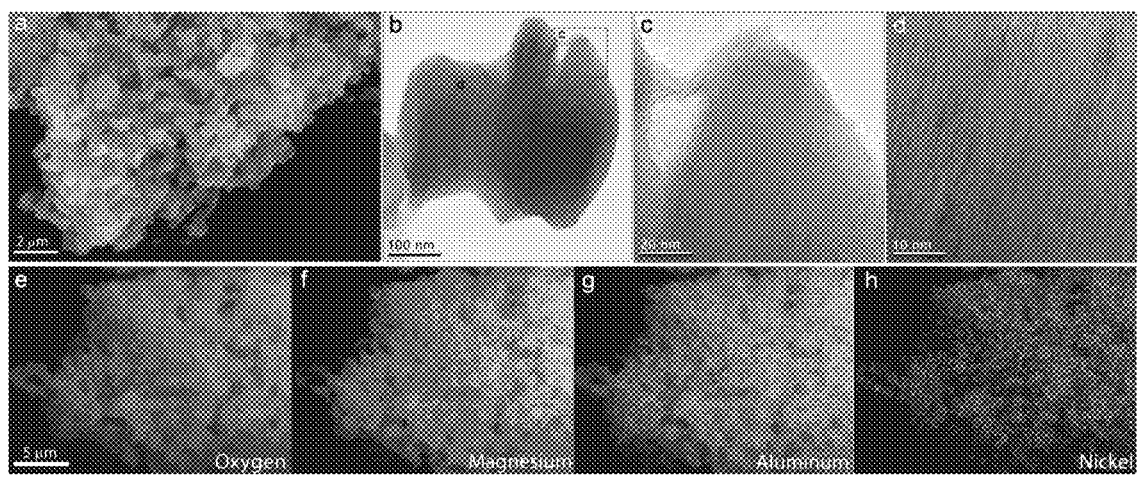
FIG. 9 shows a scanning electron microscopy image (Panel a), transmission electron microscopy images (Panels b-d) and energy dispersive X-ray spectroscopy images (Panels e-h) of 5 wt % Ni/HTC catalyst particles.

SEM imaging of fresh 5 wt % Ni/HTC shows that loading the nickel did not disrupt the highly porous substructure of the HTC support (FIG. 9a). The nanostructure of the catalysts was further investigated by TEM (FIGS. 9b-d). These images illustrate that the individual nanoscale subunits of the larger catalyst particles are largely devoid of meso and micro pores, and further supports that the macroporosity of the bulk catalyst particles is formed by the agglomeration of these constituents. An atomic layered structure of the catalyst may be observed in the high magnification image provided in FIG. 9d.

Elemental mapping of the catalyst particles revealed a largely uniform distribution of nickel throughout the catalyst at the microscale (FIG. 9h), with no evidence of phasing or localized clusters of nickel present at this scale. Interestingly, no loss of nickel from the catalyst support was detected after reaction (Table 3), indicating that there was no metal leaching during the reaction. These results support the observation of a robust incorporation of nickel into the catalyst support that is resistant to leaching and structural degradation at the reaction conditions employed in this study.

TABLE 3

EDS Elemental Analysis of LDH Catalysts - Elemental Composition (Wt %)

| Sample | Carbon | Oxygen | Magnesium | Aluminum | Nickel |
| --- | --- | --- | --- | --- | --- |
| Pre-reaction | 17.0 ± 4.2 | 53.3 ± 2.1 | 17.8 ± 1.9 | 8.3 ± 1.0 | 3.0 ± 0.4 |
| Post-reaction | 17.9 ± 5.0 | 45.1 ± 1.2 | 19.0 ± 3.4 | 11.9 ± 2.1 | 6.0 ± 0.8 |
| Catalyst Wash | 19.5 ± 7.4 | 52.7 ± 2.8 | 18.5 ± 3.7 | 8.8 ± 2.3 | 3.2 ± 0.6 |

Example 13

Preparation of Ball-Milled Lignin

Ball-milled lignin (BML) was prepared from extractives-free corn stover according to the Björkman method. Corn stover was extracted with water and ethanol for 48 hours, respectively, using a soxhlet extractor. Air-dried extractives-free corn stover was ground in toluene at 4° C. for 2 weeks, in ceramic jars (0.3 L volume) using ceramic balls under a nitrogen atmosphere. Ball-milled corn stover (1096 g) was extracted with 1.5 L of 96% dioxane (v/v) for 2 days with vigorously stirring. The suspension was filtered and solid residue was extracted with the same solvent for additional 2 days. Combined filtrate was evaporated at 40° C. under reduced pressure to obtain crude BML (31.3 g). The crude BML was dissolved in 90% acetic acid and precipitated into water. The precipitate was collected by centrifugation and then washed with water 3 times until acetic acid was removed. Freeze dried precipitate was dissolved into 85 mL of 1,2-dichloroethane/ethanol (2:1, v/v) and precipitating into diethyl ether (800 mL). The precipitate was recovered by centrifugation (18000 rpm, 10 minutes) and then washed with ether 2 times to obtain corn stover BML (14.4 g, 1.32 wt %). The lignin and carbohydrate contents in the BML were 84.4 and 7.51 wt %, respectively.

The Examples discussed above are provided for purposes of illustration and are not intended to be limiting. Still other embodiments and modifications are also contemplated.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

We claim:

1. A method for degrading lignin, comprising:
   contacting a stream consisting essentially of lignin with a layered double hydroxide (LDH) catalyst in the presence of a liquid solvent to produce a lignin degradation product; and
   isolating the lignin degradation product, wherein:
   the LDH catalyst comprises hydrotalcite (HTC) and nickel (Ni),
   an amount of the Ni combined with the HTC is between 5 wt % Ni/HTC and 15 wt % Ni/HTC, and
   the lignin degradation product comprises at least one of an aromatic or an alkane.

2. The method of claim 1, wherein the liquid solvent comprises at least one of an aqueous solvent or an organic solvent.

3. The method of claim 2, wherein the liquid solvent is methyl isobutyl ketone.

4. The method of claim 2, wherein the liquid solvent is ethanol.

5. The method of claim 2, wherein the liquid solvent is water.

6. The method of claim 1, wherein the contacting is carried out at a temperature between 200° C. and 400° C.

7. The method of claim 1, wherein the contacting is carried out at a temperature of at least 200° C.

8. The method of claim 7, wherein the contacting is carried out for less than one hour.

9. The method of claim 1, wherein the contacting is carried out for at least 15 minutes.

10. The method of claim 1, further comprising removing the LDH catalyst from the liquid solvent by filtration.

11. The method of claim 1, wherein the nickel is in a form of a water-soluble nickel salt.

12. The method of claim 11, wherein the water-soluble nickel salt is nickel nitrate.

* * * * *